UNITED STATES PATENT OFFICE.

ALFRED S. BURDICK AND CARL NIELSEN, OF CHICAGO, ILLINOIS, ASSIGNORS TO THE ABBOTT LABORATORIES, OF CHICAGO, ILLINOIS, A CORPORATION OF ILLINOIS.

PREPARED FOOD.

1,273,144.

Specification of Letters Patent. Patented July 23, 1918.

No Drawing. Application filed July 13, 1917. Serial No. 180,353.

*To all whom it may concern:*

Be it known that we, ALFRED S. BURDICK, a citizen of the United States, and CARL NIELSEN, a subject of the King of Denmark, (who has declared his intention to become a citizen of the United States,) both residing at Chicago, in the county of Cook and State of Illinois, have invented certain new and useful Improvements in Prepared Foods, of which the following is a specification.

Our invention relates to improvements in prepared foods, and has particular reference to a food which may be prepared entirely or almost entirely from vegetable materials.

Among the salient objects of the invention are to provide a vegetable food having all the necessary food constituents present in the correct balanced proportions necessary to sustain life; to provide a food of the class described which may be easily digested and which contains the necessary percentage of the socalled vitamins; to provide an article of the class described which may be prepared from relatively cheap bases, such as inexpensive grains; to provide an article of the class described which may be in course of manufacture, reduced to solid form, thereby rendering it in proper condition for shipping and storage for an extended or indefinite period of time; and, in general, to provide an improved food product of the character referred to.

Our improved food may be prepared from a leguminous grain, such as soy beans, and a cereal flour grain, such as rice. The method of manufacture is preferably such that the two bases are handled separately until a certain stage in the manufacture, when they are combined to form a prepared food.

We first take a quantity of soy beans of good average grade and wash the same thoroughly in cold water, which carries away any dirt or foreign matter adhering to the husks or outer skins of the beans. Subsequently, the washed beans are soaked in cold water for several hours until the skins have become sufficiently softened. The wash water is then drained away from the beans which are now in condition for the next step in the process. In some cases it may be desirable to remove the skins of the beans, but in most cases we prefer to leave the beans unstripped so as to obtain in the final product the maximum percentage of the so-called vitamins, these vitamins being principally contained in the skin coating of the grain or in the layer immediately beneath.

The wet beans are then finely mashed and extracted with from five to ten times their weight of cold water, which may be used either plain or containing such chemicals as calcium hydrate, which is used in a half-saturated solution. The process of extraction is continued until practically all of the protein and fat has been extracted, after which the extract liquid is filtered through heavy muslin. In order to obtain as high a yield as possible, the beans are then pressed between filter cloths, which may be of muslin, in a suitable press.

The milky liquid, which may be termed vegetable milk, thus resulting from the extraction of the beans, is now evaporated in vacuum at approximately 55° to 60° cent. until a liquid of the consistency of thick condensed milk is obtained. The individual treatment of the bean base of the food is now complete and is ready to be combined with the other base, which is prepared as follows:

Flour, obtained by grinding rice or some other suitable cereal, is boiled with sufficient water to obtain a thick uniform gruel. This gruel is then added to a suspension of one part of ground malt in four parts of water, and the mixture is heated to 65° to 70° cent. until the entire amount of starch present in the flour has been transformed into higher dextrins and sugar. The mixture is then filtered and the filtrate is evaporated in vacuum to a syrupy consistency.

The thick bean milk and the syrup are now mixed together in the quantities necessary to obtain a liquid containing the fat, carbohydrates, and protein in balanced proportions suitable for human nutrition. After thorough mixing, the liquid is desiccated in vacuum. The resultant powder is fortified by the addition of such tissue salts as may be thought of value, this constituting the final step in the manufacture of our prepared food.

Our improved food may be packed, shipped, and stored in the same manner as the standard prepared foods, such as are used for feeding infants and invalids.

It will of course be understood that in using the food a suitable quantity of water is added to make a liquid of the required strength. Such liquid food or drink is particularly desirable, for the reason that the proteins and vitamins are present in the same condition as they exist in the original grains from which the food was manufactured, the evaporation having been carried on at a sufficiently low temperature to prevent danger of decomposing or destroying them by excessive heat. The food or drink is also very easily digested, for the reason that the vegetable protein and fat are suspended in a very finely divided condition,—more so than in ordinary cows' milk. It will also be understood that the process of manufacture is such that the final product contains the minerals originally present in the grains from which the food is prepared.

Thus, our novel food is characterized by its purely vegetable character, its suspension in water as a milk-like fluid, its content of the necessary food elements in balanced proportions, including vitamins and mineral salts, and its extremely easy digestion.

Inasmuch as the details of manufacture may be modified considerably to suit individual requirements, it must be understood that the invention is not limited except as specified in the appended claims.

We claim—

1. The process of preparing a food having the ingredients necessary for body nutrition, which consists in soaking soy beans in water, draining off the water, mashing the beans, extracting the mash with water, removing the extract from the inextractable residue mechanically, malting cereal flour gruel to produce a syrupy liquid containing dextrins and sugar, filtering out the insoluble and inextractable substances from said last named liquid, mixing the bean extract with the malt liquid, and adding tissue salts in the desired proportions.

2. The process of making a prepared food having the necessary food ingredients present in balanced proportions, which consists in soaking soy beans in water, draining off the water, mashing the beans, extracting with cold water and removing the extract from the inextractable residue, malting cereal flour gruel to produce a liquid containing dextrins and sugar, filtering the same to remove the insoluble and inextractable substances from said liquid, mixing the extract and the liquid together, and subsequently evaporating the mixture to dryness in vacuum.

ALFRED S. BURDICK.
CARL NIELSEN.